(12) United States Patent
Son

(10) Patent No.: US 10,326,180 B2
(45) Date of Patent: Jun. 18, 2019

(54) SUBMODULE FOR HIGH VOLTAGE BATTERY

(71) Applicant: HYUNDAI MOBIS CO., LTD., Yongin-si (KR)

(72) Inventor: Gi Seok Son, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 412 days.

(21) Appl. No.: 15/286,659

(22) Filed: Oct. 6, 2016

(65) Prior Publication Data

US 2017/0104247 A1 Apr. 13, 2017

(30) Foreign Application Priority Data

Oct. 8, 2015 (KR) ........................ 10-2015-0141525

(51) Int. Cl.
| | |
|---|---|
| *H01M 2/00* | (2006.01) |
| *H01M 10/48* | (2006.01) |
| *H01M 2/10* | (2006.01) |
| *H01M 2/20* | (2006.01) |
| *H01M 10/42* | (2006.01) |

(52) U.S. Cl.
CPC ....... *H01M 10/482* (2013.01); *H01M 2/1077* (2013.01); *H01M 2/206* (2013.01); *H01M 10/425* (2013.01); *H01M 2010/4271* (2013.01); *H01M 2010/4278* (2013.01); *H01M 2220/20* (2013.01)

(58) Field of Classification Search
CPC .. H01M 2/1077; H01M 2/206; H01M 10/425; H01M 10/482; H01M 2010/4271; H01M 2010/4278; H01M 220/20; H01M 2220/20
See application file for complete search history.

(56) References Cited

U.S. PATENT DOCUMENTS

| | | | |
|---|---|---|---|
| 2013/0052498 A1* | 2/2013 | Han | H01M 10/48 429/90 |
| 2013/0330584 A1* | 12/2013 | Lee | H01M 10/482 429/91 |
| 2015/0037626 A1* | 2/2015 | Malcolm | H01M 2/206 429/53 |

* cited by examiner

*Primary Examiner* — Cynthia H Kelly
*Assistant Examiner* — Monique M Wills
(74) *Attorney, Agent, or Firm* — H.C. Park & Associates, PLC

(57) ABSTRACT

A submodule for high voltage batteries, in which a voltage sensing module and an electrode tap of a high voltage battery cell are elastically coupled to each other, thereby protecting the high voltage battery cell from an external force and preventing a contact defect between the electrode tap and the voltage sensing module. A pair of fastening holes, allowing a pair of first bending portions to communicate with each other are also provided. The voltage sensing module includes a first sensing module bolt-fastened to the pair of fastening holes and electrically connected to the first electrode tap and a second sensing module disposed in a direction opposite to the first sensing module, fastened to the pair of second bending portions through hook coupling, and electrically connected to the second electrode tap.

8 Claims, 9 Drawing Sheets

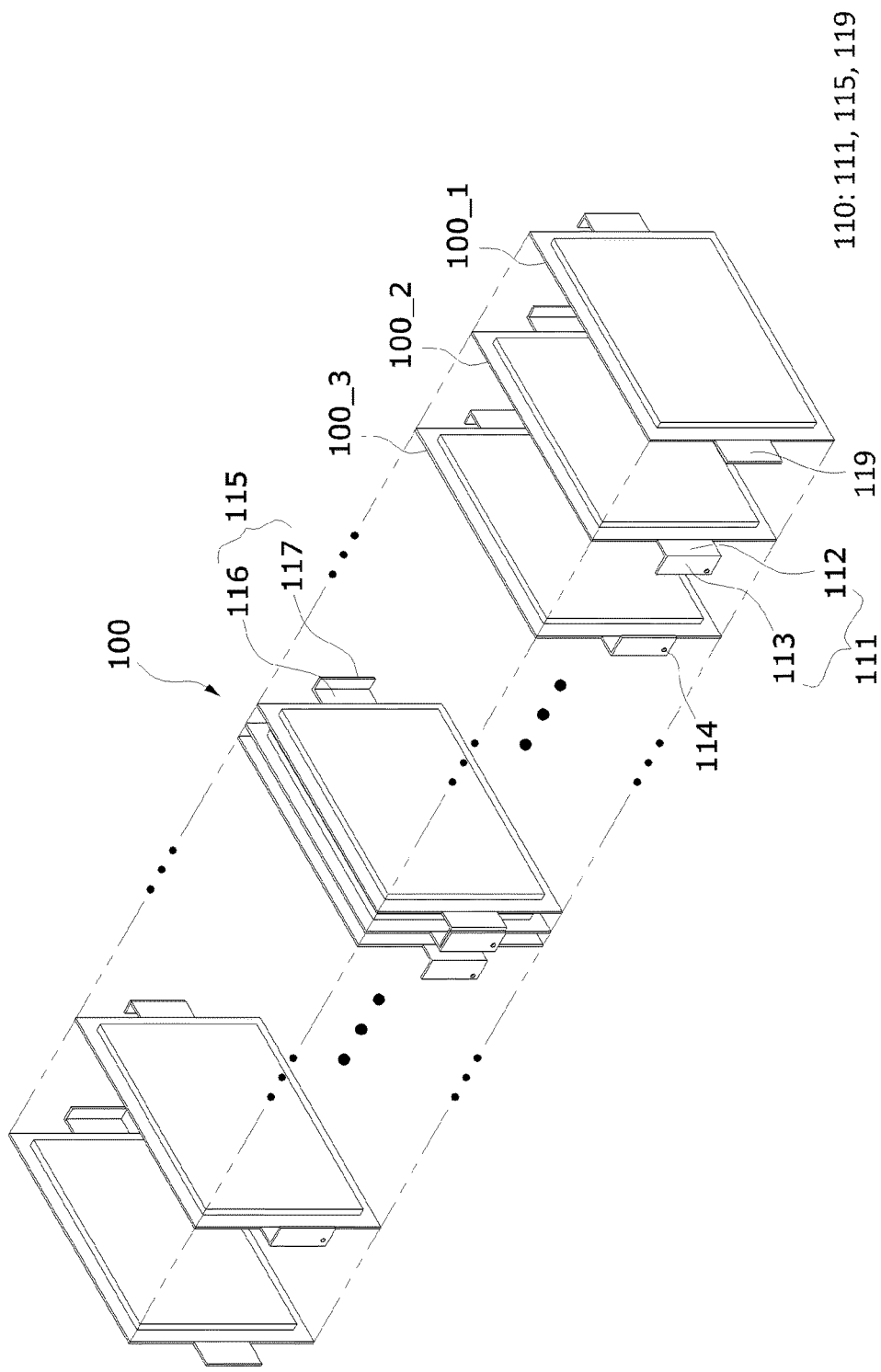

A-A'

SUBMODULE FOR HIGH VOLTAGE BATTERY

CROSS-REFERENCE TO RELATED APPLICATION

This application claims priority from and the benefit of Korean Patent Application No. 10-2015-0141525, filed on Oct. 8, 2015, which is hereby incorporated by reference for all purposes as if set forth herein.

BACKGROUND

Field

Exemplary embodiments relate to a submodule for high voltage batteries, and more particularly, to a submodule for high voltage batteries, in which a voltage sensing module and an electrode tap of a high voltage battery cell are elastically coupled to each other, thereby protecting the high voltage battery cell from an external force and preventing a contact defect is between the electrode tap and the voltage sensing module.

Discussion of the Background

Generally, hybrid electric vehicles, fuel cell vehicles, and electric vehicles are driven by an electric motor and are necessarily equipped with a high voltage battery that supplies a driving power to the electric motor.

The high voltage battery is repeatedly charged and discharged to supply a necessary power while a vehicle is driving.

The high voltage battery generally includes five battery modules.

Moreover, the five battery modules each include a plurality of battery submodules with a plurality of high voltage battery cells.

The plurality of high voltage battery cells are generally coupled to each other by an upper housing and a lower housing that respectively support an upper portion and a lower portion of the high voltage battery cells.

In this case, the high voltage battery cells are stacked surface-to-surface.

The high voltage battery cells may be manufactured as various types.

Particularly, a pouched type high voltage battery cell which is being recently and widely used among various types of high voltage battery cells uses an aluminum laminate sheet having flexibility as an external member and thus has a type which is easily bent.

The pouched type high voltage battery cell is small in weight and is low in manufacturing cost, and thus, is recently attracting much attention.

However, the pouched type high voltage battery cell is easily bent, and for this reason, when excessive force is applied from the outside, the pouched type high voltage battery cell is easily damaged.

Consequently, electrolyte inside the high voltage battery cell may leak outside the high voltage battery cell through a damaged part, or a gas may jet through the damaged part.

Moreover, a high voltage battery cell module and a pack are generally configured by stacking a plurality of pouched type high voltage battery cells, and for this reason, when electrolyte inside a specific high voltage battery cell leaks, gas is jetted, or an explosion occurs causing high voltage battery cells adjacent to the compromised high voltage battery cell to be damaged.

Moreover, since a high voltage battery is a structure which is configured by a combination of high voltage battery cells, the stability and operation efficiency of some high voltage battery cells are greatly reduced by overvoltage, overcurrent, and overheating.

Therefore, a means for detecting overvoltage, overcurrent, and overheating, which occur in high voltage battery cells, is needed. A voltage sensor or the like is connected to a high voltage battery cell, and an operating state is checked in real time or at certain intervals.

In this context, since the application range of high voltage batteries is widened, the high voltage battery is used as a power source for a vehicle, even when a strong impact or vibration is applied to the battery, the detection means should maintain a stable connection state.

Generally, in high voltage batteries, a voltage sensing module connected to a printed circuit board (PCB) and a voltage sensor may be coupled to an electrode tap, installed on a side surface of a high voltage battery cell, through welding.

Since the electrode tap is coupled to the voltage sensing module through welding, the high voltage battery cell is repeatedly expanded and contracted in charging or discharging, and for this reason, a welded portion is damaged, causing a contact defect between the electrode tap and the voltage sensing module.

Therefore, while a battery is operating, heating may become severe, and consequently, fire and explosion may occur, causing stability problems.

For this reason, in the art, research is being done on high voltage batteries in which a high voltage battery cell is easily bent to prevent damage of the high voltage battery cell, and a contact defect which occurs when an electrode tap and a voltage sensing module are damaged is prevented. However, a satisfactory result is obtained to date.

SUMMARY

Exemplary embodiments of the present disclosure provide a submodule for high voltage batteries, which prevents a contact defect between an electrode tap and a voltage sensing module from occurring due to the repeated expansion and contraction of a high voltage battery cell which are caused by welding coupling between the electrode tap and the voltage sensing module and are made when the high voltage battery cell is charged or discharged.

A battery submodule for high voltage batteries, installed in a high voltage battery system, includes a plurality of high voltage battery cells configured to store power for supplying to the high voltage battery system. The plurality of high voltage battery cells include a first high voltage battery cell, a second high voltage battery cell, and a third high voltage battery cell. Each of the first, second, and third voltage battery cells include a border having a first side and a second side, a first electrode tap including a first cell extension portion extending in a horizontal direction from the first side of the border and a first bending portion bent in a vertical direction from the first cell extension portion, and the first bending portion including a fastening hole, and a second electrode tap including a second cell extension portion extending in a horizontal direction from the second side of the border and a second bending portion bent in a vertical direction from the second cell extension portion. A battery submodule for high voltage batteries also includes a plurality of frames closely adhered to the plurality of high voltage battery cells, each of the plurality of frames having a tetragonal ring shape, a first electrode tap accommodating part, and a second electrode tap accommodating part. A battery submodule for high voltage batteries further includes a voltage sensing module configured to sense a voltage of the battery submodule and disposed within the plurality of frames. Additionally, the first bending portion of the first high voltage battery cell surface-contacts the first bending portion of the second high voltage battery cell, the second bending portion of the second high voltage battery cell surface-contacts the second bending portion of the third high voltage battery cell, and the fastening hole of the first high voltage battery cell and the fastening hole of the second high voltage battery cell overlap. Also, the voltage sensing module includes a first sensing module fastened to the fastening hole of the first and second high voltage battery cells and electrically connected to the first electrode tap of the first and second high voltage battery cells, and a second sensing module disposed in a direction opposite to the first sensing module, fastened to the second bending portions of second and third high voltage battery cells through hook coupling, and electrically connected to the second electrode tap the second and third high voltage battery cells.

The first sensing module may include a bolt member fastened to the fastening holes of the first and second high voltage battery cells through screwing and electrically connected to the first electrode taps of the first and second high voltage battery cells, and a first voltage sensing wire configured to electrically connect the bolt member to a voltage sensing printed circuit board (PCB).

The second sensing module may include a sensing clip terminal including a hanger contacting the second bending portion of the third high voltage battery cell, a terminal contacting the second bending portion of the second high voltage battery cell, and a connector connecting the hanger to the terminal and configured to apply an elastic force between the terminal and the hanger, and a second voltage sensing wire configured to electrically connect the sensing clip terminal to a voltage sensing printed circuit board (PCB).

A sensing terminal projection may be on a surface of the terminal facing and in contact with the second bending portion of the second high voltage battery cell.

The first electrode tap accommodating part may include a first accommodating groove configured to receive at least one first electrode tap of the plurality of high voltage battery cells and a reinforcing band including a through hole overlapping at least one fastening hole of the plurality of high voltage battery cells, and a second tap accommodating part may include a second accommodating groove configured to receive at least one second electrode tap of the plurality of high voltage battery cells and a cradle protruding in a direction away from the first electrode tap accommodating part at an end of the second accommodating groove.

A screw thread may be on an inner circumference surface of the through hole and is fastened to a bolt member through screwing.

A fastening nut may be fastened to the bolt member is coupled to the through hole.

Each of the plurality of frames may include a first frame closely adhered to a first side of the border of each of the plurality of high voltage battery cells and provided in a tetragonal ring shape and a second frame closely adhered to a second side of the border of each of the plurality of high voltage battery cells and coupled to the first frame to allow the each of the plurality of high voltage battery cells to be closely adhered to the first frame.

Each of the plurality of frames may include a first frame closely adhered to a first side of the border of each of the plurality of high voltage battery cells and provided in a tetragonal ring shape and a second frame closely adhered to a second side of the border of each of the plurality of high voltage battery cells and coupled to the first frame to allow the each of the plurality of high voltage battery cells to be closely adhered to the first frame. The first frame may include a first base plate having a rear surface facing the first side of the border of each of the plurality of high voltage battery cells and a front surface opposite the rear surface, a plurality of first channel projections protruding from the front surface of the first base plate and having a length that is the same as a vertical length of the first base plate, a plurality of second channel projections spaced apart from each other, disposed on the front surface of the first base plate, and disposed between the plurality of the first channel projections, the plurality of second channel projections maintaining a protrusion height which is the same as the plurality of first channel projections, and a first interval maintaining part protruding from a lower portion of the rear surface of the first base plate and having a length which is the same as a horizontal length of the first base plate. The second frame may include a second base plate having a front surface facing the second side of the border of each of the plurality of high voltage battery cells, and a second interval maintaining part protruding from an upper portion of the front surface of the second base plate and having a length which is the same as a horizontal length of the second base plate.

The foregoing general description and the following detailed description are exemplary and explanatory and are intended to provide further explanation of the claimed subject matter.

BRIEF DESCRIPTION OF THE DRAWINGS

FIG. 2 is an exploded perspective view of a high voltage battery cell of the is submodule for high voltage batteries illustrated in FIG. 1.

DETAILED DESCRIPTION OF THE ILLUSTRATED EMBODIMENTS

Figure 1:
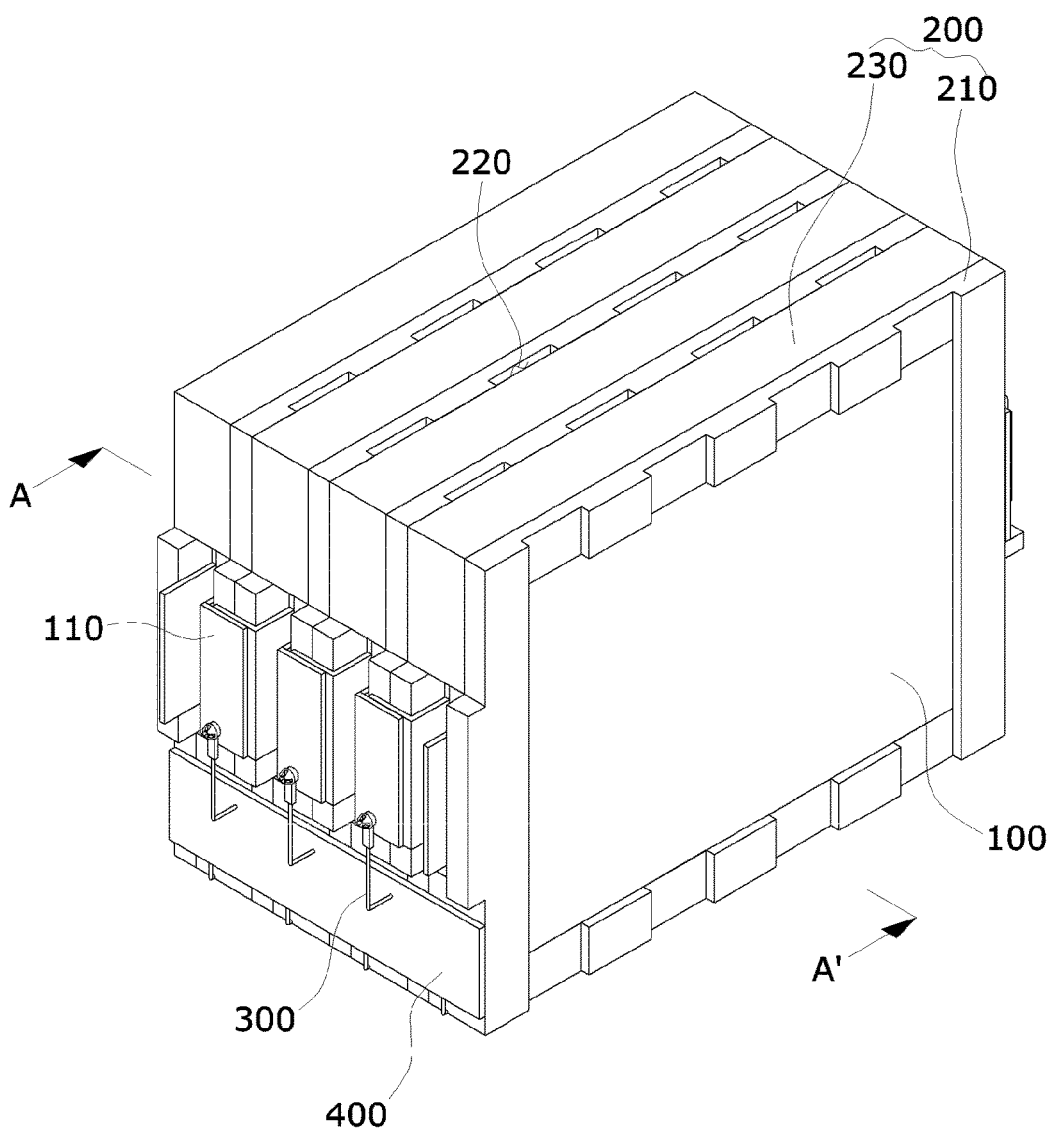
FIG. 1 is a submodule for high voltage batteries according to an embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the drawings, the size and relative sizes of regions and components may be exaggerated for clarity. Like numerals denote like elements.

When an element is referred to as being "on," "connected to," or "positioned on" another element or layer, it may be directly on, connected to, or positioned on the other element or intervening elements may be present. When, however, an element is referred to as being "directly on," "directly connected to," or "directly positioned on" another element, there are no is intervening elements present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, components, regions, and/or sections, these elements, components, regions, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

Spatially relative terms, such as "beneath," "below," "lower," "above," "upper," "left," "right," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "have," "having," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments of the present disclosure will be described in detail with reference to the accompanying drawings. In adding reference numerals for elements in each figure, it should be noted that like reference numerals already used to denote like elements in other figures are used for elements wherever possible. Moreover, detailed descriptions related to well-known functions or configurations will be ruled out in order not to unnecessarily obscure subject matters of the present disclosure.

In describing a submodule for high voltage batteries according to an embodiment of the present disclosure, in order to help understand the present embodiment, submodules for high voltage batteries will be described as being stacked in a horizontal direction.

Figure 3A:
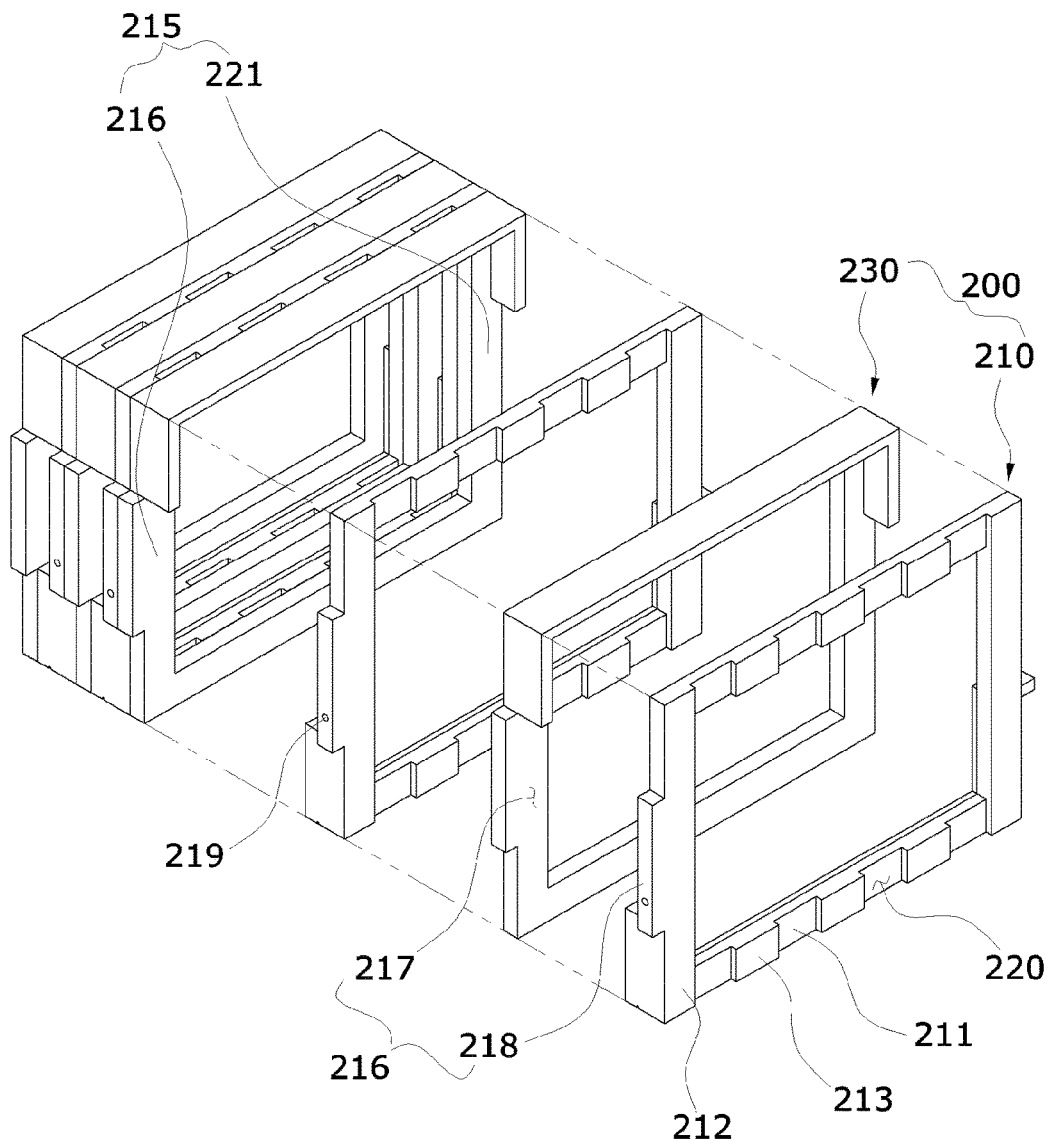
FIGS. 3A and 3B are exploded perspective views illustrating a frame of the submodule for high voltage batteries illustrated in FIG. 1.
Figure 3B:
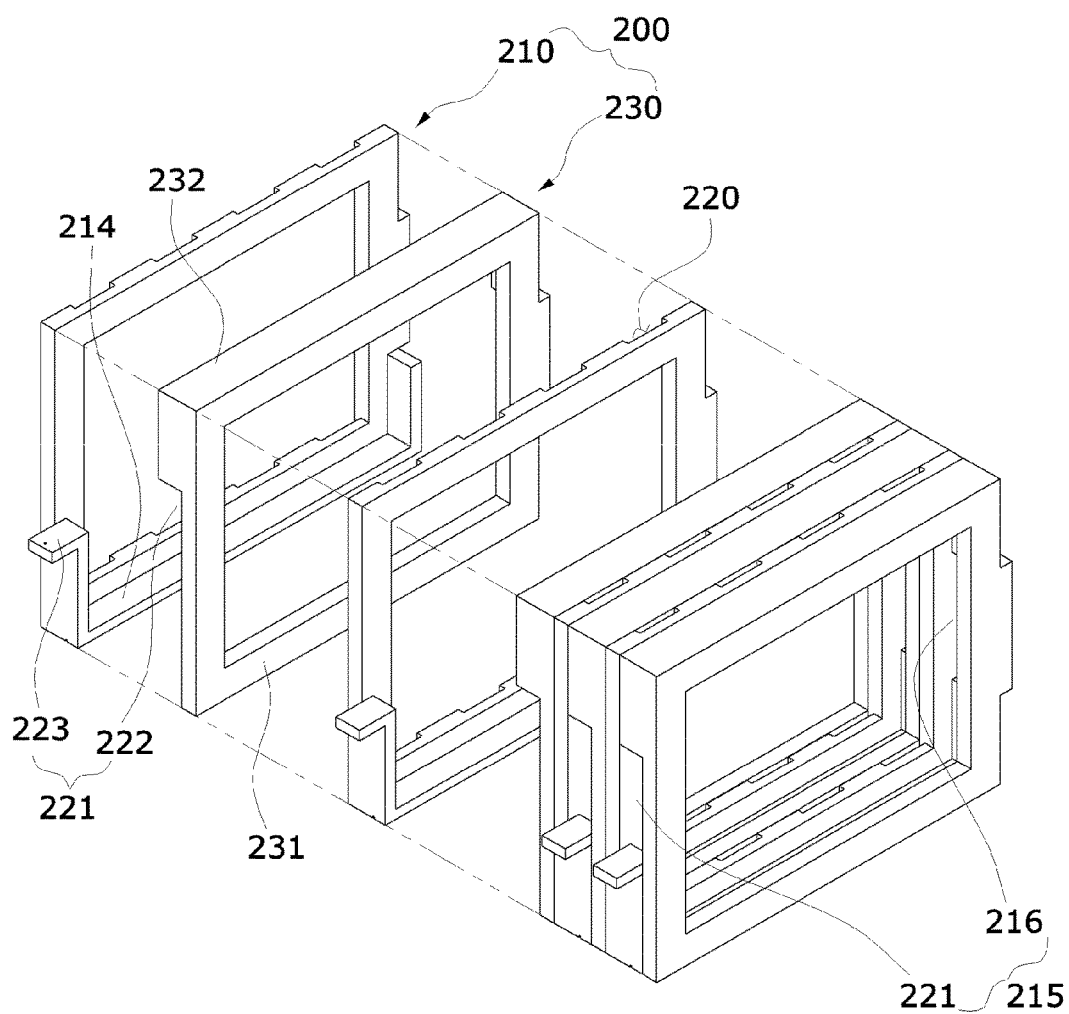
Figure 4:
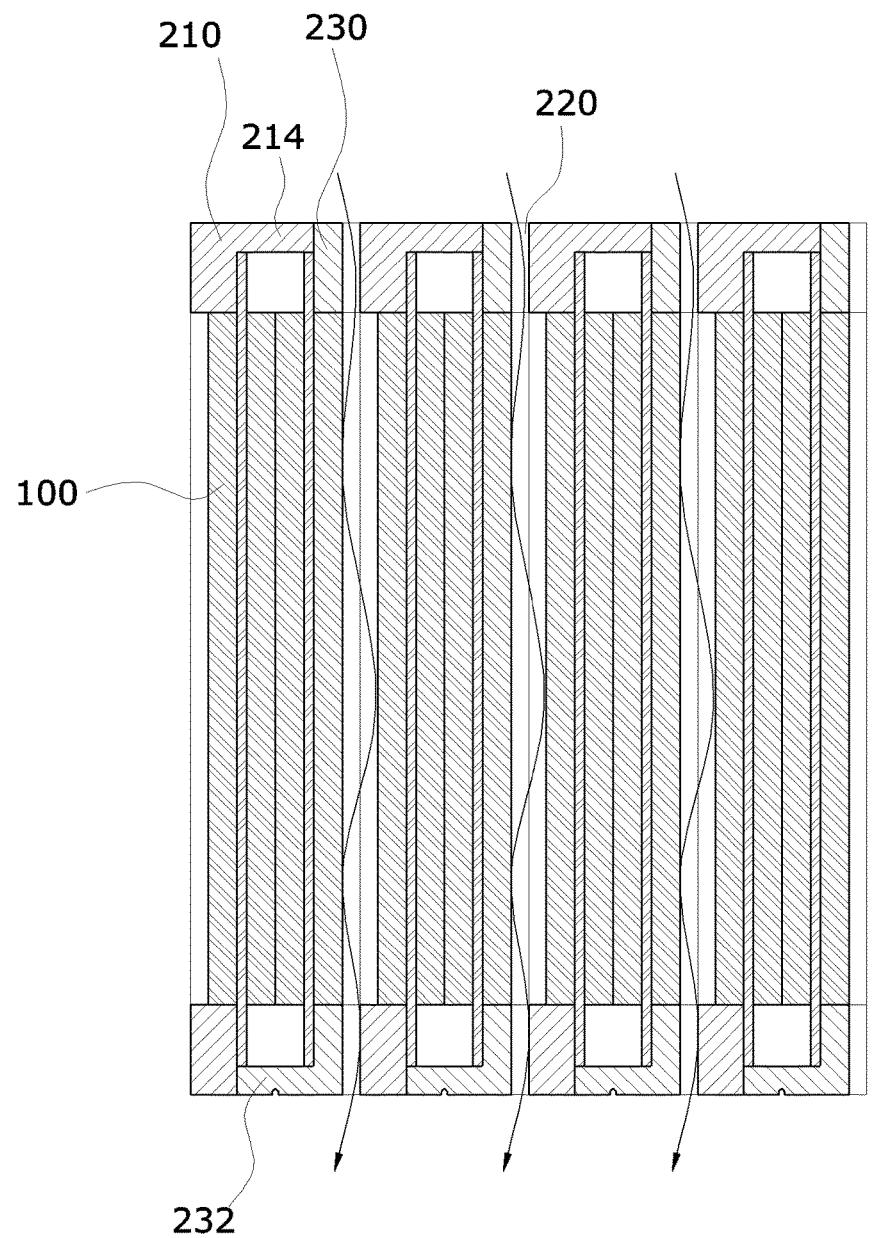
FIG. 4 is a cross-sectional view taken along line A-A' of FIG. 1.
Figure 5:
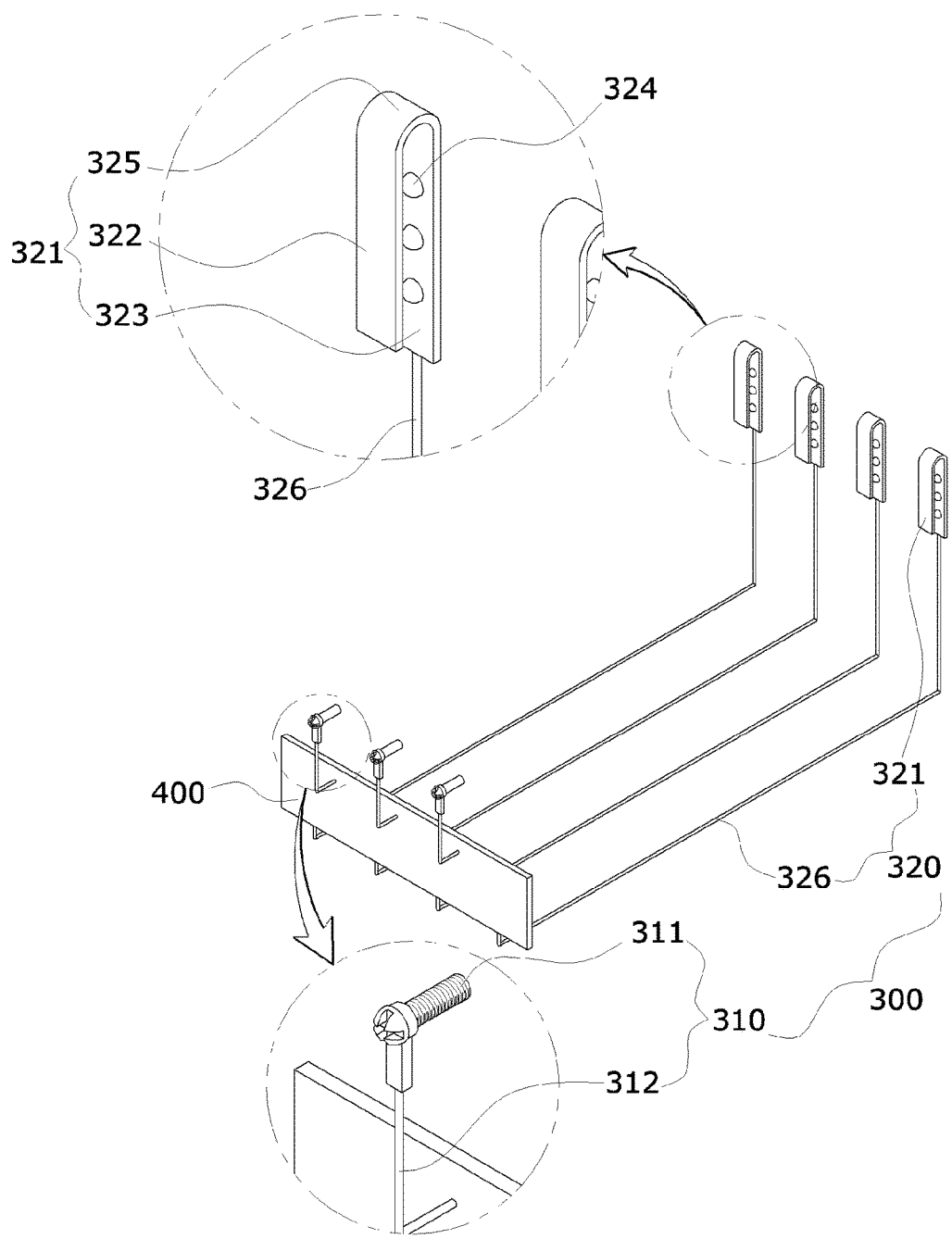
FIG. 5 is a perspective view illustrating a voltage sensing module of the submodule for high voltage batteries illustrated in FIG. 1.
Figure 6A:
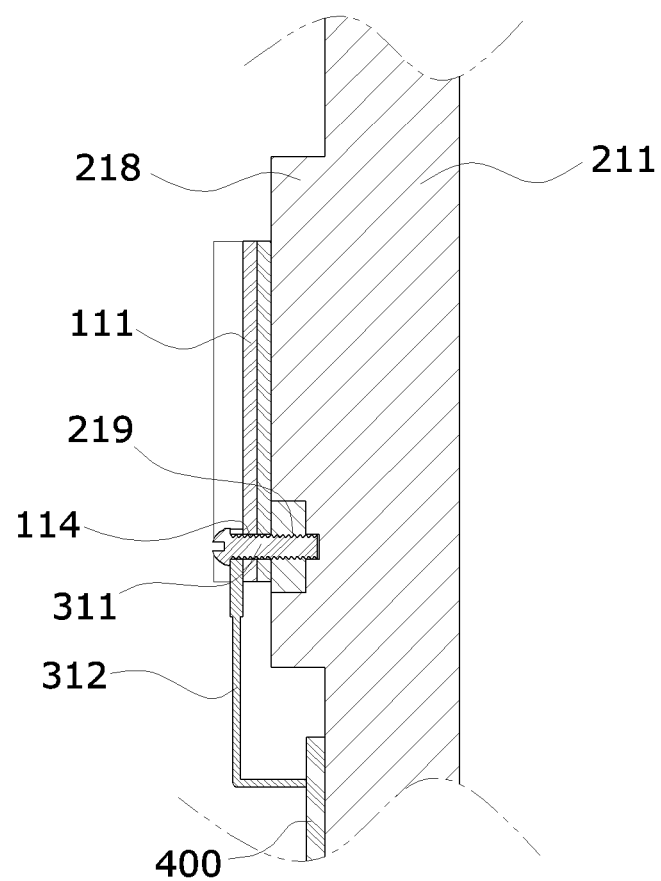
FIGS. 6A and 6B are cross-sectional views illustrating a coupling relationship of the voltage sensing module illustrated in FIG. 1.
Figure 6B:
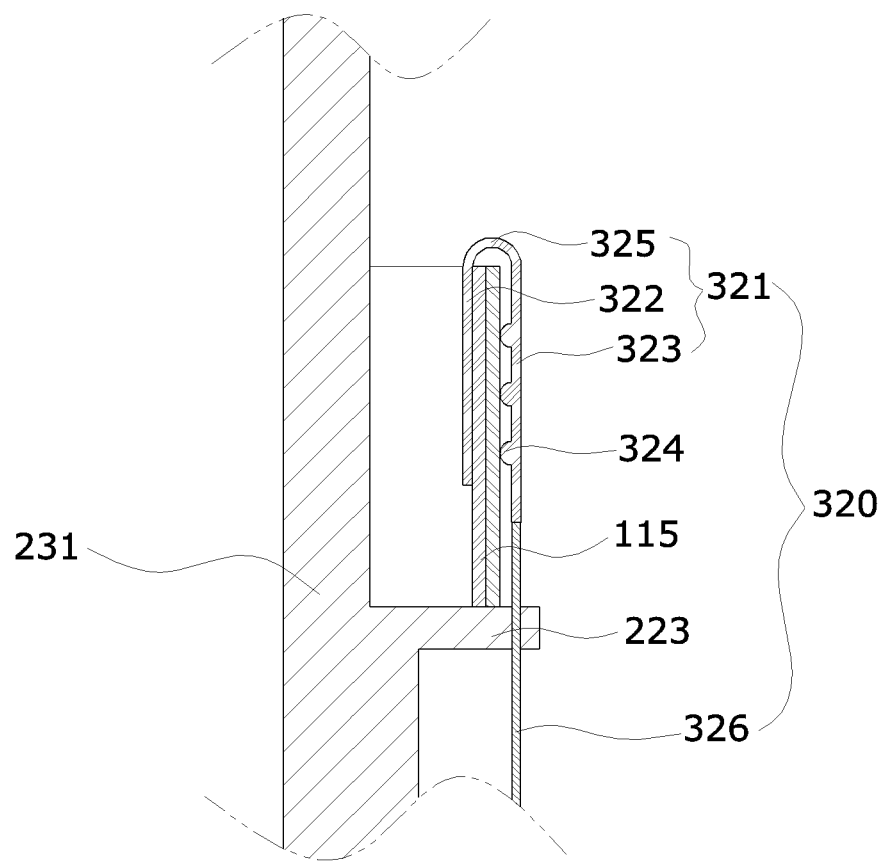

FIG. 1 is a submodule for high voltage batteries according to an embodiment of the present disclosure. FIG. 2 is an exploded perspective view of a high voltage battery cell of the submodule for high voltage batteries illustrated in FIG. 1. FIGS. 3A and 3B are exploded perspective views illustrating a frame of the submodule for high voltage batteries illustrated in FIG. 1. FIG. 4 is a cross-sectional view taken along line A-A' of FIG. 1. FIG. 5 is a perspective view illustrating a voltage sensing module of the submodule for high voltage batteries illustrated in FIG. 1. FIGS. 6A and 6B are cross-sectional views illustrating a coupling relationship of the voltage sensing module illustrated in FIG. 1.

The submodule for batteries may include a high voltage battery cell 100, a frame 200, and a voltage sensing module 300.

The high voltage battery cell 100 may store power which is to be supplied to a high voltage battery system. A plurality of high voltage battery cells 100 may be provided. The plurality of high voltage battery cells 100 may surface-contact each other and may be stacked in a horizontal direction.

A battery submodule may include a plurality of high voltage battery cells 100 each of the high voltage battery cells may be manufactured as various types. In the present embodiment, the high voltage battery cells 100 may be a pouched type.

If the high voltage battery cell 100 is the pouched type, a shape of the high voltage battery cell 100 is relatively freely designed, and a weight of the high voltage battery cell 100 is light. Accordingly, the pouched type high voltage battery cell 100 may be mainly applied to a vehicle battery including a plurality of high voltage battery cells.

Since the high voltage battery cell 100 may be the pouched type, a weight of a battery submodule is reduced.

In the high voltage battery cell 100, the electrode tap 110 including a positive terminal and a negative terminal may be provided in each of both ends of the high voltage battery cell 100.

The electrode tap 110 may include the positive terminal and the negative terminal, and the positive terminal and the negative terminal may extend in a horizontal direction from both sides of a border of the high voltage battery cell 100.

The electrode tap 110 may include a first electrode tap 111, a second electrode tap 115, and a third electrode tap 119.

The first electrode tap 111 may extend in a horizontal direction from one of the both sides of the border of the high voltage battery cell 100.

The first electrode tap 111 may include a first cell extension portion 112, which extends in a horizontal direction from a side of the high voltage battery cell 100, and a first bending portion 113 which is bent in a vertical direction from the first cell extension portion 112.

That is, the first electrode tap 111 may include a cross-sectional surface having a rectangular shape.

The first electrode tap 111 including the cross-sectional surface having a rectangular shape may be provided in a second high voltage battery cell 100_2 that surface-contact a first high voltage battery cell 100_1 disposed in an outermost portion in one end direction.

Moreover, the first electrode tap 111 including the cross-sectional surface having a rectangular shape may be provided in a third high voltage battery cell 100_3 that is disposed in a direction opposite to a direction in which the first high voltage battery cell 100_1 is disposed, with respect to the second high voltage battery cell 100_2, and surface-contact the second high is voltage battery cell 100_2.

In a plurality of the first electrode taps 111 each including the cross-sectional surface having a rectangular shape, a first electrode tap 111 provided in the second high voltage battery cell 100_2 may include a first bending portion 113 which is bent in a direction from the first cell extension portion 112 to the third high voltage battery cell 100 3, and another first electrode tap 111 provided in the third high voltage battery cell 100_3 may include a first bending portion 113 which is bent in a direction from the first cell extension portion 112 to the second high voltage battery cell 100_2.

The first bending portion 113 provided in the second high voltage battery cell 100_2 may overlap the first bending portion 113 provided in the third high voltage battery cell 100_3.

Accordingly, the first bending portion 113 provided in the second high voltage battery cell 100_2 may surface-contact and may be electrically connected to the first bending portion 113 provided in the third high voltage battery cell 100_3.

An even-numbered high voltage battery cell 110 and an odd-numbered high voltage battery cell 100 disposed close thereto may surface-contact and may be repeatedly stacked with respect to one end direction of the battery submodule. A plurality of the first bending portions 113 may surface-contact each other and may be electrically connected to each other.

A fastening hole 114 may be formed in each of a pair of first bending portions 113 which surface-contact each other.

The fastening hole 114 may enable the pair of first bending portions 114 surface-contacting each other to communicate with each other.

The voltage sensing module 300 may be solidly fastened to the first electrode tap 111.

The second electrode tap 115 may extend in a horizontal direction from a side opposite to a side, on which the first electrode tap 111 is provided, among sides of the border of the high voltage battery cell 100.

The second electrode tap 115 may include a second cell extension portion 116, which extends in a horizontal direction from a side of the high voltage battery cell 100, and a second bending portion 117 which is bent in a vertical direction from the second cell extension portion 116.

That is, the second electrode tap 115 may include a cross-sectional surface having a rectangular shape like the first electrode tap 111.

The second electrode tap 115 including the cross-sectional surface having a rectangular shape may be provided in the first high voltage battery cell 100_1 which is disposed in the outermost portion in the one end direction.

Moreover, the second electrode tap 115 including the cross-sectional surface having a rectangular shape may be provided in the second high voltage battery cell 100_2 which surface-contacts the first high voltage battery cell 100_1.

In a plurality of the second electrode taps 115 each including the cross-sectional surface having a rectangular shape, a second electrode tap 115 provided in the first high voltage battery cell 100_1 may include a second bending portion 117 which is bent in a direction from the second cell extension portion 116 to the second high voltage battery cell 100_2, and another second electrode tap 117 provided in the second high voltage battery cell 100_2 may include a second bending portion 117 which is bent in a direction from the second cell extension portion is 116 to the first high voltage battery cell 100_1.

Therefore, the second bending portion 117 provided in the first high voltage battery cell 100_1 may overlap the second bending portion 117 provided in the second high voltage battery cell 100_2.

Accordingly, the second bending portion 117 provided in the first high voltage battery cell 100_1 may surface-contact and may be electrically connected to the second bending portion 117 provided in the second high voltage battery cell 100_2.

An even-numbered high voltage battery cell 110 and an odd-numbered high voltage battery cell 100 disposed close thereto may surface-contact and may be repeatedly stacked with respect to one end direction of the battery submodule. A plurality of the second bending portions 117 may surface-contact each other and may be electrically connected to each other.

Consequently, the first electrode tap 111 and the second electrode tap 115 may be connected to each other and may be stacked.

The third electrode tap 119 may be provided on a side, which is disposed in the same direction as a direction in which the first electrode tap 111 is provided, among sides of the high voltage battery cell 100 disposed in one end direction and the other end direction of the battery submodule among a plurality of the high voltage battery cells 100 which are stacked to surface-contact each other.

The third electrode tap 119 may include a cross-sectional surface which extend in a horizontal direction and has a rectilinear shape.

The third electrode tap 119 having a rectilinear shape may be electrically connected to a bus bar.

The frame 200 may be formed of an insulating material and may electrically insulate the high voltage battery cells 100. In terms of characteristic of a material, the frame 200 enhances lightness and durability of the high voltage battery cells 100.

Referring to FIGS. 3A and 3B, the frame 200 may be closely adhered to the border of the high voltage battery cell 100 and may be provided in a tetragonal ring shape.

The frame 200 may include a first frame 210 and a second frame 230.

The first frame 210 may be formed of an insulating material such as plastic or the like.

Since the first frame 210 is formed of an insulating material, the first frame 210 may electrically insulate the high voltage battery cells 100. In terms of characteristic of a material, the first frame 210 enhances lightness and durability of the high voltage battery cells 100.

The first frame 210 may be closely adhered to a border of the high voltage battery cell 100 in one direction and may be provided in a tetragonal ring shape.

A surface of the high voltage battery cell 100 may be directly exposed to a gas for cooling the high voltage battery cell 100.

Accordingly, since the first frame 210 directly exposes the high voltage battery cell 100 to a gas, heat occurring in the high voltage battery cell 100 may be more efficiently cooled than the related art.

The first frame 210 may include a first base plate 211, a first channel projection 212, a second channel projection 213, a first interval maintaining part 214, and an electrode tap accommodating part 215.

The first base plate 211 may be provided in a tetragonal ring shape overlapping a is border of the high voltage battery cell 100 in one direction.

The first base plate 211 may have an area larger than that of the high voltage battery cell 100 so as to accommodate the high voltage battery cell 100 therein.

The first base plate 211 may be accommodated into the high voltage battery cell 100 to support the high voltage battery cell 100.

The first channel projection 212 may be adhered to a front surface of each of both sides of the first base plate 211 and may have a length which is the same as a vertical length of the first base plate 211.

Since the first channel projection 212 has a length which is the same as a vertical length of the first base plate 211, a gas flowed in from the outside is prevented from being leaked to outside the both sides of the first base plate 211.

Accordingly, the cooling efficiency of the high voltage battery cell 100 may be increased.

A plurality of second channel projections 213 may be provided. The plurality of second channel projections 213 may be spaced apart from each other and may be disposed on an upper front surface and a lower front surface of the first base plate 211 and between a plurality of the first channel projections 212.

The second channel projection 213 may have a protrusion height which is the same as that of the first channel projection 212.

Since the second channel projections 213 are spaced apart from each other and are disposed on the upper front surface and the lower front surface of the first base plate 211 and between the first channel projections 212, a cooling channel 220 through which the gas flowed in from the outside flows may be provided between the second channel projections 213 which are is spaced apart from each other.

As illustrated in FIG. 4, since the cooling channel 220 is provided between the second channel projections 213, the gas flowed in from the outside may easily flow along the cooling channel 220.

Therefore, since the cooling channel 220 is provided between the second channel projections 213, heat occurring in the high voltage battery cell 100 is easily cooled.

The first interval maintaining part 214 may protrude from a lower rear surface of the first base plate 211 and may have a length which is the same as a horizontal length of the first base plate 211.

The first interval maintaining part 214 may be disposed at a position, which is lower in position than a bottom of the high voltage battery cell 100, in a lower portion of the first frame 210 in order for the high voltage battery cell 100 to be accommodated into the first frame 210.

The first interval maintaining part 214 may have a thickness thinner than that of the high voltage battery cell 100.

Since the first interval maintaining part 214 is disposed in the lower portion of the first frame 210 and has a thickness thinner than that of the high voltage battery cell 100, the high voltage battery cell 100 may be solidly supported by the first frame 210 and the second frame 230 due to assembly pressure in assembling the first frame 210 to the second frame 220.

The electrode tap accommodating part 215 may accommodate the electrode tap 110 therein and may be disposed at a position, corresponding to the electrode tap 110, in a border of the frame 200.

The electrode tap accommodating part 215 may include a first tap is accommodating part 216 and a second tap accommodating part 221.

The first tap accommodating part 216 may be disposed at a position, corresponding to the first electrode tap 111, in the border of the frame 200.

The first electrode tap 111 may be accommodated into the first tap accommodating part 216, and the first tap accommodating part 216 may be opened to communicate with the outside, thereby allowing the first bending portion 113 to be exposed to the outside.

The first tap accommodating part 216 may include a first accommodating groove 217 and a reinforcing band 218.

The first accommodating groove 217 may be opened at a position, corresponding to the first electrode tap 111, in the border of the frame 200 in order for the inside and the outside of the frame 200 to communicate with each other.

Since the first accommodating groove 217 is opened in order for the inside and the outside of the frame 200 to communicate with each other, an outer surface of the first bending portion 113 may be exposed to outside the frame 200 when the first electrode tap 111 is accommodated into the first accommodating groove 217.

The reinforcing band 218 may protrude in an outer direction from the border of the frame 200 with respect to a position close to the first accommodating groove 217.

The pair of first bending portions 113 which surface-contact each other may be disposed on an outer surface of the reinforcing band 218 in a surrounding form.

Therefore, the reinforcing band 218 may solidly support the first electrode tap 111 in order for the first electrode tap 111 not to be bent or damaged by an external force.

A through hole 219 which fixes the first bending portion 113 may be formed in is the reinforcing band 218.

The through hole 219 may be fastened to the voltage sensing module 300 to be described below.

A screw thread may be provided on an inner circumference surface of the through hole 219 in order for the voltage sensing module 300 to be fastened to the screw thread, but is not limited thereto. In other embodiments, a fastening nut may be coupled to the inner circumference surface of the through hole 219.

The second tap accommodating part 221 may be disposed at a position, corresponding to the second electrode tap 115, in the border of the frame 200.

The second electrode tap 115 may be accommodated into the second tap accommodating part 221, and the second tap accommodating part 221 may be opened to communicate with the outside, thereby allowing the second bending portion 117 to be exposed to the outside.

The second tap accommodating part 221 may include a second accommodating groove 222 and a cradle 223.

The second accommodating groove 222 may be opened at a position, corresponding to the second electrode tap 115, in the border of the frame 200 in order for the inside and the outside of the frame 200 to communicate with each other.

Since the second accommodating groove 222 is opened in order for the inside of the frame 200 to communicate with the outside, an outer surface of the second bending portion 117 may be exposed to outside the frame 200 when the second electrode tap 115 is accommodated into the second accommodating groove 222.

The cradle 223 may protrude in an outer direction from the border of the frame is 200 with respect to a lower end of the second accommodating groove 222.

The cradle 223 may support a bottom of the pair of first bending portions 113 which surface-contact each other.

Therefore, the cradle 223 may solidly support a load of the voltage sensing module 300 when the voltage sensing module 300, to be described below, is hung on the second electrode tap 115.

The second frame 230 may be formed of an insulating material such as plastic or the like.

Since the second frame 230 is formed of an insulating material, the second frame 230 may electrically insulate the high voltage battery cells 100. In terms of characteristic of a material, the second frame 230 may decrease a weight and increase a durability of the high voltage battery cells 100.

The second frame 230 may be closely adhered to another border of the high voltage battery cell 100 and may be assembled or disassembled to or from the first frame 210.

The second frame 230 may be coupled to the first frame 210 with the high voltage battery cell 100 being closely adhered toward the first frame 210.

The high voltage battery cell 100 may be disposed between the first frame 210 and the second frame 230.

The second frame 230 may include a second base plate 231 and a second interval maintaining part 232.

The second base plate 231 may be provided in a tetragonal ring shape overlapping another border of the high voltage battery cell 100.

The second base plate 231 may have an area larger than that of the high voltage battery cell 100 so as to accommodate the high voltage battery cell 100 therein.

The second interval maintaining part 232 may protrude to the same height as the first interval maintaining part 214 from an upper front surface of the second base plate 231 and may have a length which is the same as a horizontal length of the second base plate 231.

The second interval maintaining part 232 may be disposed at a position, which is higher in position than an upper portion of the high voltage battery cell 100, in an upper portion of the second frame 230 in order for the high voltage battery cell 100 to be accommodated into the second frame 230.

The second interval maintaining part 232 may be coupled to the first interval maintaining part 214 in a direction facing each other. In this case, the first interval maintaining part 214 may be provided on a lower rear surface of the first base plate 211, and the second interval maintaining part 232 may be provided on an upper front surface of the second base plate 231. Accordingly, a distance between the first base plate 211 and the second base plate 231 may be maintained as equal to a protrusion height of each of the first and second interval maintaining parts 214 and 232.

The second interval maintaining part 232 may have a thickness thinner than that of the high voltage battery cell 100.

Since the second interval maintaining part 232 is disposed in the upper portion of the second frame 232 and has a thickness thinner than that of the high voltage battery cell 100, the high voltage battery cell 100 may be solidly supported by the first frame 210 and the second frame 230 due to assembly pressure in assembling the first frame 210 to the second frame 220.

Referring to FIG. 5, the voltage sensing module 300 may be formed a conductor and may contact the electrode tap 110. The voltage sensing module 300 may sense a voltage of the high voltage battery cell 100.

The voltage sensing module 300 may be electrically connected to a battery management system (BMS), which determines a remaining capacity of the high voltage battery cell 100 and necessity to charge, through a voltage sensing PCB 400 that controls an operation of the battery submodule. The voltage sensing module 300 may transfer a voltage, sensed from the high voltage battery cell 100, to the BMS.

The voltage sensing module 300 may include a first sensing module 310 and a second sensing module 320.

A plurality of first sensing modules 310 may be provided. The plurality of first sensing modules 310 may be respectively fastened to the pair of first bending portions 113 and may be electrically connected to the first electrode tap 111.

The first sensing module 310 may include a bolt member 311 and a first voltage sensing wire 312.

The bolt member 311, as illustrated in FIG. 6A, may be fastened to, through screwing, a fastening hole 114 formed in the first electrode tap 111 and a through hole 219 formed in the reinforcing band 218 and may be electrically connected to the first electrode tap 111. The bolt member 311 may be solidly supported by the reinforcing band 218.

Unlike the related art where the voltage sensing module 300 is coupled to the electrode tap 110 by soldering, according to the present embodiment, the first sensing module 310 and the first electrode tap 111 may be solidly fastened to each other through bolt coupling by using the bolt member 311. Therefore, even when the high voltage battery cell 100 is repeatedly expanded and contracted in charging or discharging the battery submodule, a mutual contact defect does not occur between the first electrode tap 111 and the first sensing module 310.

The first voltage sensing wire 312 may be formed of a wire including a conductor and may electrically connect the bolt member 311 to the voltage sensing PCB 400.

The first voltage sensing wire 312 may be electrically connected to the bolt member 311 and the voltage sensing PCB 400 which are electrically connected to the first electrode tap 111, and thus, may transfer a detection voltage, detected from the first electrode tap 111, to the voltage sensing PCB 400.

The second sensing module 320 may be provided as a number equal to the number of the first sensing modules 310 and may be disposed in a direction opposite to the first sensing module 310 with respect to the high voltage battery cell.

The second sensing module 320, as illustrated in FIG. 6B, may be fastened to a pair of second bending portions 117 through hook coupling and may be electrically connected to the second electrode tap 115.

The second sensing module 320 may include a sensing clip terminal 321 and a second voltage sensing wire 326.

The sensing clip terminal 321 may be fastened to, through hook coupling, the pair of second bending portions 117 which surface-contact each other. The sensing clip terminal 321 may include a hanger 322, a terminal 323, and a connector 325.

The hanger 322 may contact a surface of a second bending portion 117, which is disposed in a direction in which the high voltage battery cell 100 is disposed, among the pair of second bending portions 117 which surface-contact each other.

The terminal 323 may contact a surface of a second bending portion 117, which is disposed in a direction opposite to a direction in which the high voltage battery cell 100 is disposed, among the pair of second bending portions 117 which surface-contact each other.

A plurality of sensing terminal projections 324 may be formed on a surface of the terminal 323 in a direction facing the second bending portion 117.

The sensing terminal projections 324 may be formed in the terminal 323 and may solidly compress the sensing clip terminal 321 to the second bending portion 117.

The connector 325 may be provided in an arc shape where an elastic force is generated in an inner direction. The connector 325 may be disposed on an upper end of each of the hanger 322 and the terminal 323 and may apply an elastic force in a direction facing the hanger 322 and the terminal 323.

Therefore, the sensing clip terminal 321 may be solidly fastened to the pair of second bending portions 117 which surface-contact each other.

In this case, the hanger 322 and the sensing terminal projection 324 may be spaced apart from each other by a distance which is less than or equal to a thickness of the pair of second bending portions 117 surface-contacting each other.

The sensing clip terminal 321 may be more solidly fastened to the pair of second bending portions 117 which surface-contact each other.

Accordingly, since the sensing clip terminal 321 is solidly compressed to the pair of second bending portions 117 which surface-contact each other, a mutual contact defect between the sensing clip terminal 321 and the second bending portions 117 is prevented even when the high voltage battery cell 100 is repeatedly expanded and contracted in charging or discharging the battery submodule.

The second voltage sensing wire 326 may be formed of a wire including a conductor and may electrically connect the sensing clip terminal 321 to the voltage sensing PCB 400.

The second voltage sensing wire 326 may be electrically connected to the sensing clip terminal 321 to the voltage sensing PCB 400 which are electrically connected to the second electrode tap 115, and thus, may transfer a detection voltage, detected from the second electrode tap 115, to the voltage sensing PCB 400.

Hereinafter, an assembly sequence of the submodule for high voltage batteries according to an embodiment of the present disclosure will be described.

Figure 7:
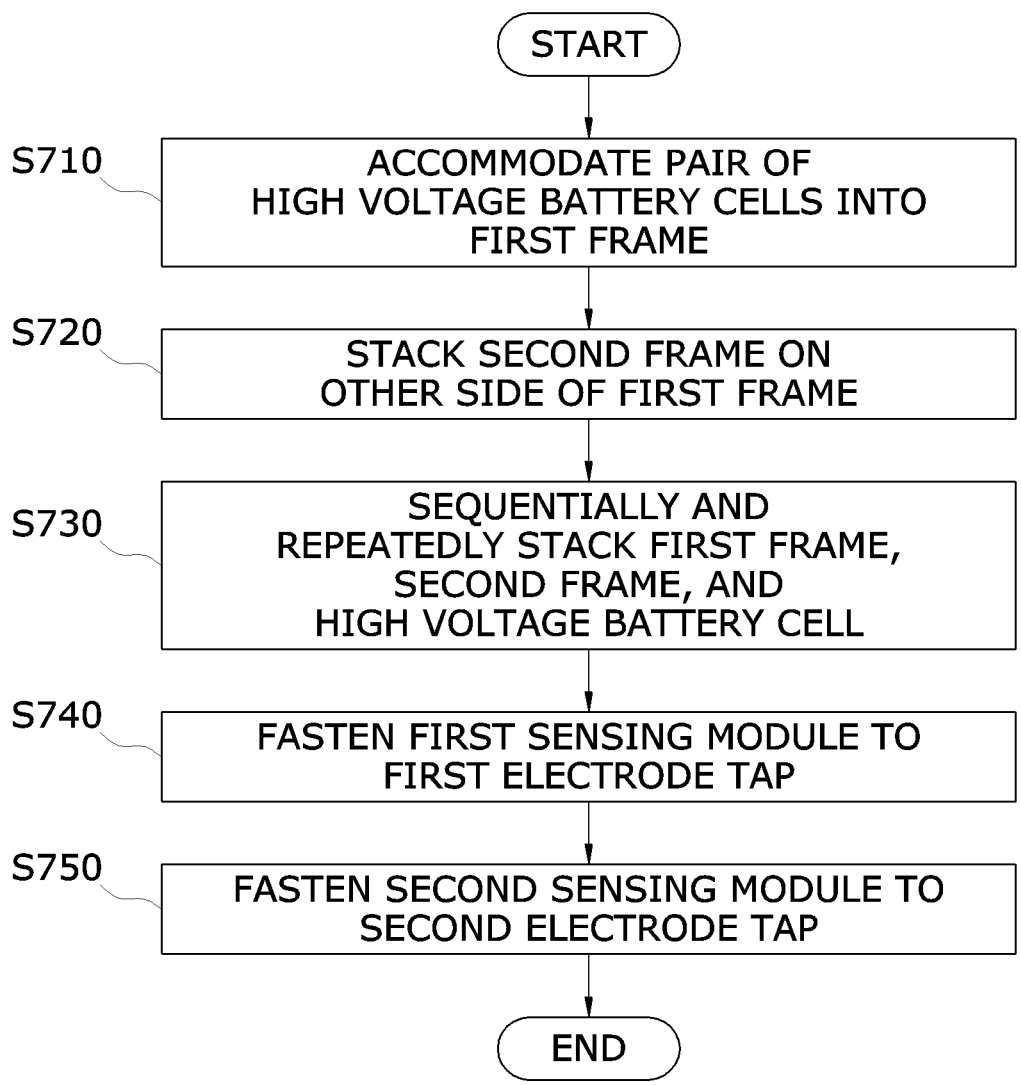
FIG. 7 is a flowchart illustrating a coupling sequence of a submodule for high voltage batteries according to an embodiment of the present disclosure.

FIG. 7 is a flowchart illustrating a coupling sequence of a submodule for high voltage batteries according to an embodiment of the present disclosure.

In step S710, a pair of high voltage battery cells 100 may be accommodated into the first frame 210.

In step S720, the second frame 230 may surface-contact and may be stacked on the other side of the first frame 210.

The first tap accommodating part 216 and the second tap accommodating part 221 may be provided on both sides of the first frame 210, and the high voltage battery cell 100 may include the first electrode tap 111 and the second electrode tap 115 which are disposed in a horizontal direction from both sides thereof.

The first electrode tap 111 may be accommodated into the first tap accommodating part 216, and the second electrode tap 115 may be accommodated into the second tap accommodating part 221.

In the first high voltage battery cell 100_1 among the pair of high voltage battery cells 100 disposed in the first frame 210, the third electrode tap 119 disposed in the same direction as a direction in which the first electrode tap 111 is provided may include a cross-sectional surface having a rectilinear shape, and the second electrode tap 115 disposed in a direction opposite to a direction in which the third electrode tap 119 is provided may be provided in rectangular shape.

The second bending portion 117 of the second electrode tap 115 provided in the first high voltage battery cell 100_1 may surface-contact the second bending portion 117 of the second electrode tap 115 provided in the second high voltage battery cell 100_2.

Therefore, a plurality of high voltage battery cells may be electrically connected to each other by an electrode tap.

In step S730, the first frame 210, the second frame 230, and the high voltage battery cell may be sequentially and repeatedly stacked.

Accordingly, the first electrode tap 111 and the second electrode tap 115 may be coupled to each other and stacked.

In step S740, the first sensing module 310 including the bolt member 311 may be fastened to the first electrode tap 111 through screwing.

Therefore, since the first sensing module 310 and the first electrode tap 111 are solidly fastened to each other through bolt coupling by using the bolt member 311, a mutual contact defect between the first electrode tap 111 and the first sensing module 310 is prevented even when the high voltage battery cell 100 is repeatedly expanded and contracted in charging or discharging the battery submodule.

In step S750, the second sensing module 320 may be fastened to the second electrode tap 115 through a hook coupling.

Therefore, since the second sensing module 320 is solidly compressed to the pair of second bending portions 117 which surface-contact each other, a mutual contact defect between the second sensing module 320 and the second bending portions 117 is prevented even when the high voltage battery cell 100 is repeatedly expanded and contracted in charging or discharging the battery submodule.

As described above, in the submodule for high voltage batteries according to the present embodiment, since the first sensing module 310 and the first electrode tap 111 are solidly fastened to each other through bolt coupling, a mutual contact defect between the first electrode tap 111 and the first sensing module 310 is prevented even when the high voltage battery cell 100 is repeatedly expanded and contracted in charging or discharging the battery submodule.

Since the connector 325 is disposed on an upper end of each of the hanger 322 and the terminal 323, the second sensing module 320 having an elastic force which is added in a direction in which the hanger 322 and the terminal 323 face each other is solidly fastened to the second electrode tap 115 through hook coupling, and thus, a mutual contact defect between the second electrode tap 115 and the second sensing module 320 is prevented even when the high voltage battery cell 100 is repeatedly expanded and contracted in charging or discharging the battery submodule.

Since a gas directly contacts a surface of the high voltage battery cell 100, the gas may flow to a surface of each of the first and second frames 210 and 230, thereby efficiently cooling the high voltage battery cell 100.

Since the pair of first bending portions 113 which mutually surface-contact each other are disposed on an outer surface of the reinforcing band 218 in a surrounding form, the first electrode tap 111 may be solidly supported in order for the first electrode tap 111 not to be bent or damaged by an external force.

The cradle 223 may support the bottoms of the pair of first bending portions 113 which mutually surface-contact each other, and thus, when the voltage sensing module 300 is hung on the second electrode tap 115, the cradle 223 may solidly supports a load of the voltage sensing module 300.

The second channel projection 213 configures the cooling channel 220 and thus enables a gas, flowed in from the outside, to easily flow along the cooling channel 220, thereby easily cooling heat which occurs in the high voltage battery cell 100.

In the submodule for high voltage batteries according to the embodiments of the present disclosure, since the first sensing module and the first electrode tap are solidly fastened to each other through bolt coupling, a mutual contact defect between the first electrode tap and the first sensing module is prevented even when the high voltage battery cell is repeatedly expanded and contracted in charging or discharging the battery submodule.

Since the connector is disposed on an upper end of each of the hanger and the terminal, the second sensing module having an elastic force which is added in a direction in which the hanger and the terminal face each other is solidly fastened to the second electrode tap through hook coupling, and thus, a mutual contact defect between the second electrode tap and the second sensing module is prevented even when the high voltage battery cell is repeatedly expanded and contracted in charging or discharging the battery submodule.

Since a gas directly contacts a surface of the high voltage battery cell, the gas may flow to a surface of each of the first and second frames, thereby efficiently cooling the high voltage battery cell.

Since the pair of first bending portions which mutually surface-contact each other are disposed on an outer surface of the reinforcing band in a surrounding form, the first electrode tap may be solidly supported in order for the first electrode tap not to be bent or damaged by an external force.

The cradle may support the bottoms of the pair of first bending portions which mutually surface-contact each other, and thus, when the voltage sensing module is hung on the second electrode tap, the cradle may solidly support a load of the voltage sensing module.

The second channel projection configures the cooling channel and thus may enable a gas, flowed in from the outside, to easily flow along the cooling channel, thereby easily cooling heat which occurs in the high voltage battery cell.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A battery submodule for batteries, installed in a high voltage battery system, comprising:
 a plurality of battery cells configured to store power for supplying to the battery system, the plurality of battery cells comprising a first battery cell, a second battery cell, and a third battery cell, and each of the first, second, and third battery cells comprising:
  a border comprising a first side and a second side;
  a first electrode tap comprising:
   a first cell extension portion extending in a horizontal direction from the first side of the border; and
   a first bending portion bent in a vertical direction from the first cell extension portion, and the first bending portion comprising a fastening hole; and
  a second electrode tap comprising:
   a second cell extension portion extending in a horizontal direction from the second side of the border; and
   a second bending portion bent in a vertical direction from the second cell extension portion;
 a plurality of frames closely adhered to the plurality of battery cells, each of the plurality of frames having a tetragonal ring shape, a first electrode tap accommodating part, and a second electrode tap accommodating part; and
 a voltage sensing module configured to sense a voltage of the battery submodule and disposed within the plurality of frames,
 wherein:
 the first bending portion of the first battery cell surface-contacts the first bending portion of the second battery cell;
 the second bending portion of the second battery cell surface-contacts the second bending portion of the third battery cell;
 the fastening hole of the first battery cell and the fastening hole of the second battery cell overlap;
 the voltage sensing module comprises:
  a first sensing module fastened to the fastening hole of the first and second battery cells and electrically connected to the first electrode tap of the first and second battery cells; and
  a second sensing module disposed in a direction opposite to the first sensing module, fastened to the second bending portions of second and third battery cells through hook coupling, and electrically connected to the second electrode tap the second and third battery cells;
 the first electrode tap accommodating part comprises a first accommodating groove configured to receive at least one first electrode tap of the plurality of battery cells and a reinforcing band comprising a through hole overlapping at least one fastening hole of the plurality of battery cells; and
 the second electrode tap accommodating part comprises a second accommodating groove configured to receive at least one second electrode tap of the plurality of battery cells, and a cradle protruding in a direction away from the first electrode tap accommodating part at an end of the second accommodating groove.

2. The battery submodule of claim 1, wherein the first sensing module comprises:
 a bolt member fastened to the fastening holes of the first and second battery cells through screwing, and electrically connected to the first electrode taps of the first and second battery cells; and a first voltage sensing wire configured to electrically connect the bolt member to a voltage sensing printed circuit board (PCB).

3. The battery submodule of claim 1, wherein the second sensing module comprises:
 a sensing clip terminal comprising a hanger contacting the second bending portion of the third battery cell, a terminal contacting the second bending portion of the second battery cell, and a connector connecting the hanger to the terminal and configured to apply an elastic force between the terminal and the hanger; and a second voltage sensing wire configured to electrically connect the sensing clip terminal to a voltage sensing printed circuit board (PCB).

4. The battery submodule of claim 3, wherein a sensing terminal projection is provided on a surface of the terminal facing and in contact with the second bending portion of the second battery cell.

5. The battery submodule of claim 1, wherein a screw thread is provided on an inner circumference surface of the through hole and is fastened to a bolt member through screwing.

6. The battery submodule of claim 1, wherein a fastening nut fastened to the bolt member is coupled to the through hole.

7. The battery submodule of claim 1, wherein each of the plurality of frames comprises:
   a first frame closely adhered to a first side of the border of each of the plurality of battery cells and provided in a tetragonal ring shape; and
   a second frame closely adhered to a second side of the border of each of the plurality of battery cells and coupled to the first frame to allow the each of the plurality of battery cells to be closely adhered to the first frame.

8. The battery submodule of claim 7, wherein:
the first frame comprises:
   a first base plate having a rear surface facing the first side of the border of each of the plurality of battery cells and a front surface opposite the rear surface;
   a plurality of first channel projections protruding from the front surface of the first base plate and having a length that is the same as a vertical length of the first base plate;
   a plurality of second channel projections spaced apart from each other, disposed on the front surface of the first base plate, and disposed between the plurality of the first channel projections, the plurality of second channel projections maintaining a protrusion height which is the same as the plurality of first channel projections; and
   a first interval maintaining part protruding from a lower portion of the rear surface of the first base plate and having a length which is the same as a horizontal length of the first base plate; and
the second frame comprises:
   a second base plate having a front surface facing the second side of the border of each of the plurality of battery cells; and
   a second interval maintaining part protruding from an upper portion of the front surface of the second base plate and having a length which is the same as a horizontal length of the second base plate.

* * * * *